(12) United States Patent
Nung

(10) Patent No.: US 7,990,420 B2
(45) Date of Patent: Aug. 2, 2011

(54) IMAGE CAPTURING DEVICE AND AUTO-PHOTOGRAPHING METHOD THEREOF

(75) Inventor: Pei-Chen Nung, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 406 days.

(21) Appl. No.: 12/171,270

(22) Filed: Jul. 10, 2008

(65) Prior Publication Data

US 2009/0219412 A1    Sep. 3, 2009

(30) Foreign Application Priority Data

Feb. 29, 2008   (CN) .......................... 2008 1 0300444

(51) Int. Cl.
*H04N 5/228*   (2006.01)
*H04N 5/232*   (2006.01)

(52) U.S. Cl. .................................. 348/208.13; 348/352

(58) Field of Classification Search ............. 348/231.99, 348/222.1, 208.99, 208.13, 333.11, 352
See application file for complete search history.

(56) References Cited

U.S. PATENT DOCUMENTS

| | | | |
|---|---|---|---|
| 7,580,071 B2 * | 8/2009 | Uchiyama | 348/251 |
| 2002/0149681 A1 * | 10/2002 | Kahn et al. | 348/211.99 |
| 2004/0239776 A1 * | 12/2004 | Shinohara et al. | 348/239 |
| 2005/0163402 A1 * | 7/2005 | Aiso | 382/300 |

* cited by examiner

*Primary Examiner* — Lin Ye
*Assistant Examiner* — Trung Diep
(74) *Attorney, Agent, or Firm* — Zhigang Ma

(57) ABSTRACT

A method of auto-photographing for an image capturing device is disclosed. A predetermined time for auto-photographing is counted down. Consecutive preview images of a scene to be photographed are acquired after the predetermined time begins to be counted. Whether a moving object bursts into the scene to be photographed is detected by comparing the consecutive preview images. If the moving object bursts into the scene to be photographed, the predetermined time for auto-photographing is recounted down again.

15 Claims, 4 Drawing Sheets

IMAGE CAPTURING DEVICE AND AUTO-PHOTOGRAPHING METHOD THEREOF

BACKGROUND

1. Field of the Invention

The invention relates to image capturing devices and, particularly, to an image capturing device and an auto-photographing method thereof.

2. Description of the Related Art

Most cameras have a self-timing function. The self-timing function triggers a shutter of the camera automatically to allow the user to take pictures freehanded. One of the challenges of utilizing the self-timing function is that someone or an object may undesirably or suddenly appear into the to-be-photographed scene during the delay of the shutter and become a part of the picture, thus ruining the captured picture.

Therefore, it is desirable to provide an image capturing device and auto-photographing method thereof, which can overcome the above-mentioned problem.

SUMMARY

A method of auto-photographing for an image capturing device is disclosed. A predetermined time for auto-photographing is counted down. Consecutive preview images of a scene to be photographed are acquired after the predetermined time begins to be counted. Whether a moving object bursts into the scene to be photographed is detected by comparing the consecutive preview images. If the moving object bursts into the scene to be photographed, the predetermined time for auto-photographing is recounted down again.

BRIEF DESCRIPTION OF THE DRAWINGS

Many aspects of the present image capturing device and auto-photographing method should be better understood with reference to the following drawings. The components in the drawings are not necessarily drawn to scale, the emphasis instead being placed upon clearly illustrating the principles of the present image capturing device and auto-photographing method. Moreover, in the drawings, like reference numerals designate corresponding parts throughout the several views.

DETAILED DESCRIPTION

Embodiments of the present image capturing device and auto-photographing method will now be described in detail with reference to the drawings.

Figure 1:
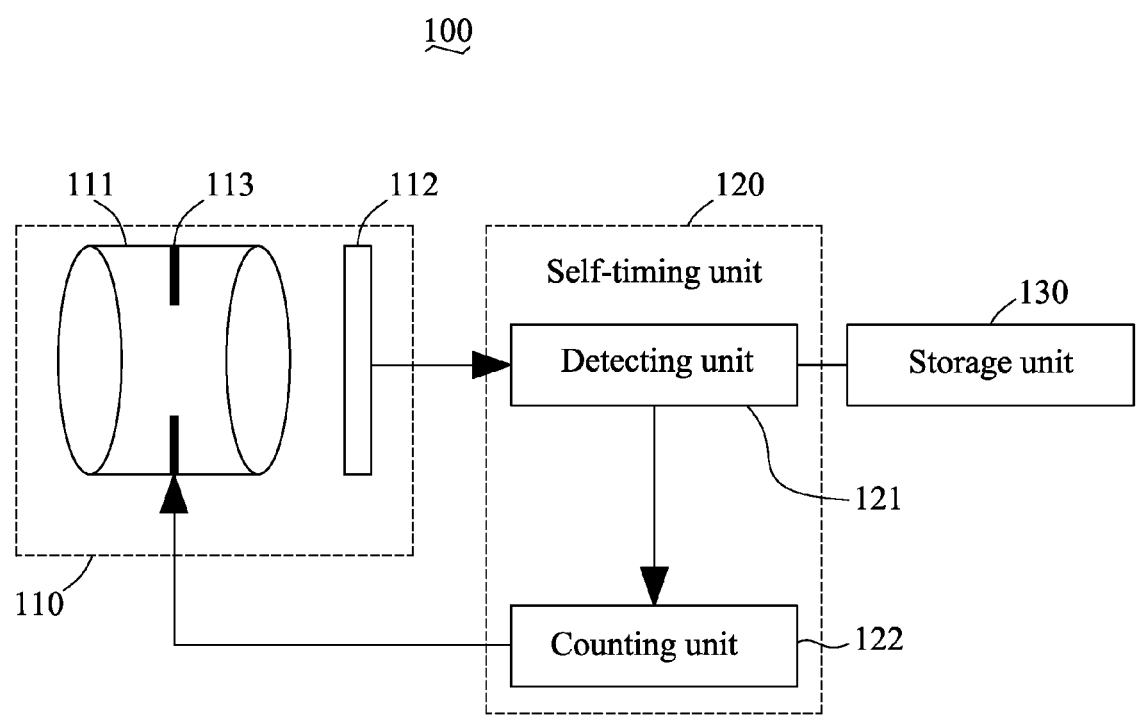
FIG. 1 is a block diagram showing an image capturing device including a self-timing unit, according to an exemplary embodiment.

Referring to FIG. 1, an image capturing device 100 is shown. The image capturing device 100 includes a capturing unit 110, a self-timing unit 120, and a storage unit 130. The capturing unit 110 is configured for capturing images of a scene and includes a shutter 113. The self-timing unit 120 includes a detecting unit 121 and a counting unit 122. The detecting unit 121 is configured for acquiring at least three consecutive preview images of a scene to be photographed, and detecting whether at least one moving object bursts into the scene to be photographed, if yes, reset the counting unit 122. The counting unit 122 is configured for counting down a predetermined time (a delay between the shutter 113 pressing and the shutter 113 triggering) and triggering the shutter 113 to capture images after the countdown.

Figure 2:
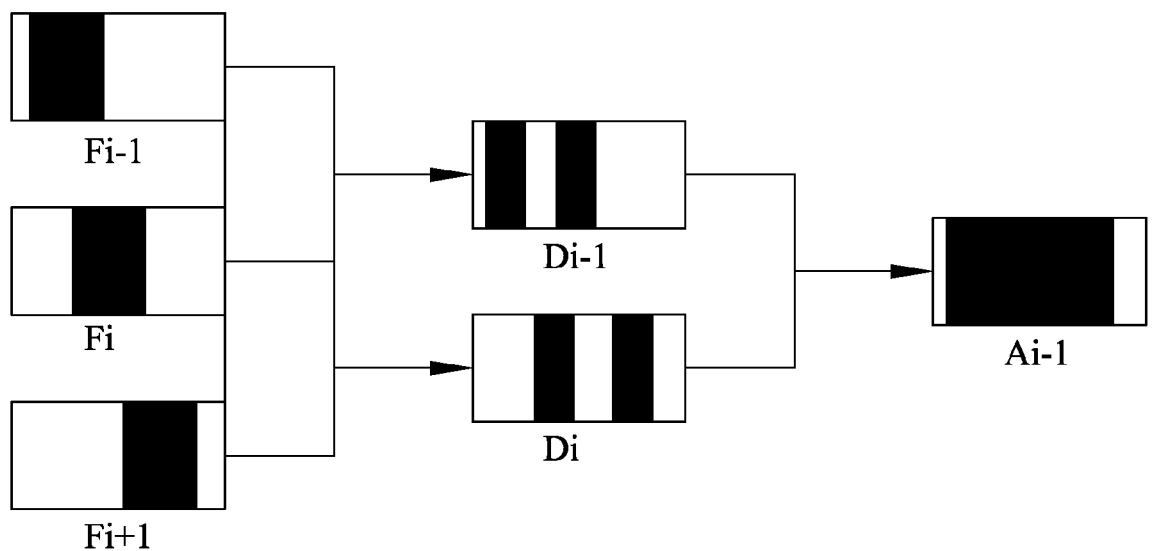
FIG. 2 is a schematic view illustrating a working principle of the self-timing unit of FIG. 1.
Figure 3:
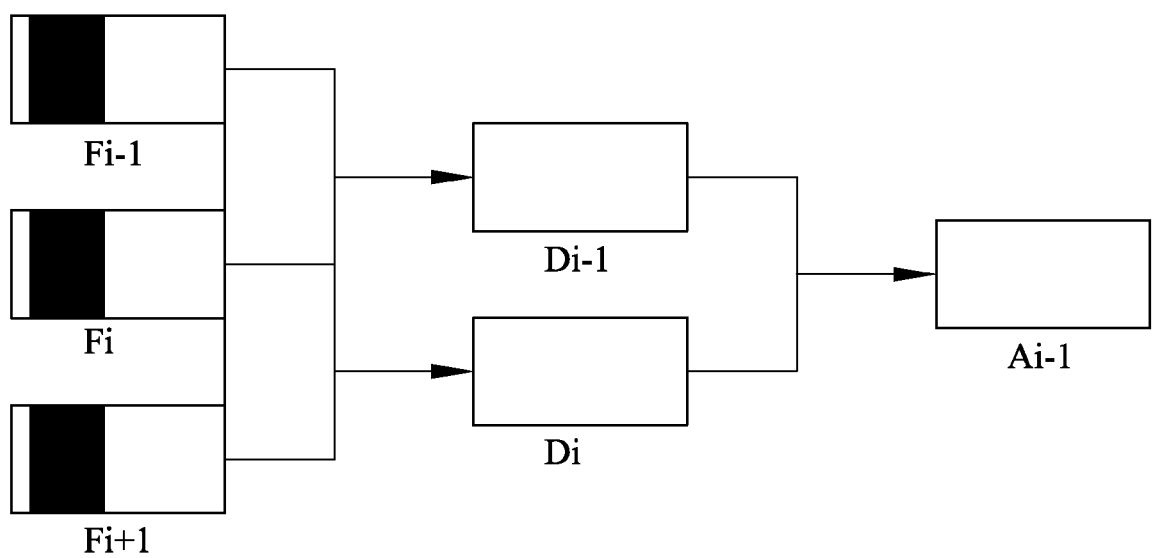
FIG. 3 is a schematic view illustrating another working principle of the self-timing unit of FIG. 1.

For example, referring to FIGS. 2 and 3, three consecutive preview images Fi−1, Fi, Fi+1 of the scene to be photographed are given. The detecting unit 121 first detects foregrounds of the preview images Fi−1, Fi, Fi+1 within dark portions respectively. This is achieved by using various methods such as a pattern recognition method and so on. The detecting unit 121 then superposes the first two preview images Fi−1, Fi and the latter two preview images Fi, Fi+1 as two combined images Di−1 and Di by filling white or other colors in an overlapped portion of the foregrounds. Next, the combined images Di−1 and Di are superposed again to obtain a judging image Ai−1 by same method. Understandably, if the judging image Ai−1 has a dark portion (see FIG. 2), the objects in the scene to be photographed must have changed its position during the formation of the three given preview images Fi−1, Fi, Fi+1. In other words, at least one moving object bursts into the scene to be photographed. Conversely, if the judging image Ai−1 has no dark portion, the scene to be photographed represents no moving object bursting into the scene to be photographed (see FIG. 3). If the moving object bursts into the scene to be photographed, the counting unit 122 is reset for recounting down a predetermined time. If no moving object bursts into the scene to be photographed, the shutter 113 triggers after the countdown to capture a final image. The captured images are stored in the storage unit 130.

In addition to the shutter 113, the capturing unit 110 may include a lens unit 111 and an image sensor 112. The shutter 113 is embedded in the lens unit 111. The image sensor 112 may be a charge-coupled device (CCD) image sensor or complementary metal-oxide-semiconductor (CMOS) image sensor, and is configured for, together with the lens unit 111, forming consecutive preview images of the scene to be photographed before the shutter 130 is triggered, and a final image after the shutter 130 is triggered.

Figure 4:
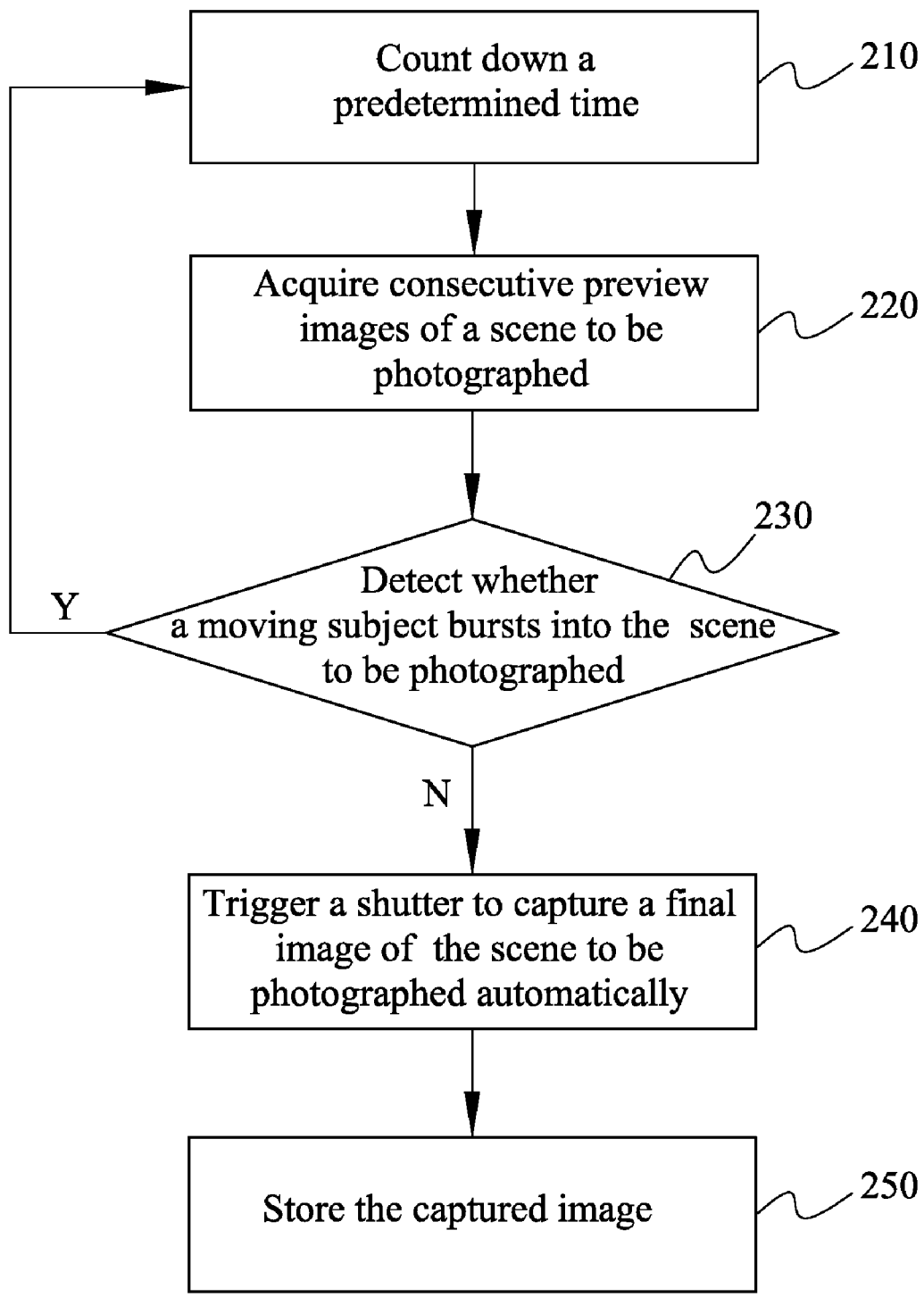
FIG. 4 is a flow chart showing an auto-photographing method of the image capturing device, according to another exemplary embodiment.

Referring to FIG. 4, an auto-photographing method of an image capturing device 100 includes the steps 210 through 250.

Step 210: Counting down a predetermined time for auto-photographing. In detail, the countdown is carried out by the counting unit 122 in response to a user's input.

Step 220: Acquiring consecutive preview images of a scene to be photographed when the predetermined time begins to be counted. For example, the three consecutive image frames Fi−1, Fi, Fi+1 formed by the capturing unit 110 are acquired by the detecting unit 121 (see FIGS. 2 through 3).

Step 230: Detecting whether a moving object bursts into the scene to be photographed by comparing with the acquired consecutive preview images. If yes, returning to step 210, the predetermined time for auto-photographing is recount down again. If no, goes to step 240. In this embodiment, step 230 is executed by the detecting unit 121. The three consecutive preview images Fi−1, Fi, Fi+1 of the scene to be photographed are formed (see FIGS. 2 through 3). First, foregrounds of the preview images shown by dark portions are detected respectively. The first two preview images Fi−1, Fi and the latter two preview images Fi, Fi+1 are superposed as two combined images Di−1 and Di by filling white or other light colors in an overlapped portion of the foregrounds. Next, the combined images Di−1 and Di are superposed again to obtain a judging image Ai−1 by same method. Understandably, if the judging image Ai−1 has a dark portion (see FIG. 2), the objects in the scene to be photographed must have changed its position during the formation of the three given preview images Fi−1, Fi, Fi+1. In other words, at least one moving object bursts into the scene to be photographed. Conversely, if the judging image Ai−1 has no dark portion, objects in the scene to be photographed remain at its original positions without any moving objects bursts therein (see FIG. 3).

Step 240: Triggering the shutter 113 to capture a final image of the scene to be photographed automatically. In this embodiment, when the shutter 113 triggers the capturing unit 110, the final image is captured by the capturing unit 110.

Step 250: Storing the captured image. In this embodiment, the captured image is stored in the storage unit 130.

The present method of auto-photographing for the image capturing device 100 can detect whether a moving object bursts into the scene to be photographed, and thereby determining when to trigger the shutter to capture a final image. It can enhance probability of successful auto-photographing.

It is to be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A method of auto-photographing for an image capturing devices, comprising:
    counting down a predetermined time for auto-photographing;
    acquiring three consecutive preview images of a scene to be photographed after the predetermined time begins to be counted;
    detecting whether a moving object in the scene to be photographed by comparing the consecutive preview images; and
    if a moving object is detected in the scene, performing the counting step, the acquiring step and the detecting step again,
    wherein the three consecutive preview images are superposed as two combined images and meantime the two combined images are superposed again to obtain a judging image by filling a white or light color in an overlapped portion of the foregrounds for detecting a moving object.

2. The method as claimed in claim 1, further comprising auto-photographing a final image of the scene if no moving object is detected in the scene.

3. The method as claimed in claim 1, wherein a dark portion within the judging image represents the moving object in the scene to be photographed.

4. The method as claimed in claim 1, wherein a white or light color filled in the judging image filled with a white or light color filled represents no moving object in the scene to be photographed.

5. The method as claimed in claim 1, further comprising storing the captured final image in a storage unit after the image is captured.

6. The method as claimed in claim 5, wherein the image of the scene to be photographed is captured by a sensor selected from the group consisting of a charge-coupled device image sensor and a complementary metal-oxide-semiconductor image sensor.

7. An image capturing device for auto-photographing, comprising:
    a capturing unit for capturing a final image and three consecutive preview images of a scene to be photographed, the three consecutive preview images are superposed as two combined images and meantime the two combined images are superposed again to obtain a judging image by filling a white or light color in an overlapped portion of the foregrounds for detecting a moving object;
    a self-timing unit having a counting unit and a detecting unit, the counting unit being configured for counting a predetermined time to automatically snapshoot, and the detecting unit being configured for acquiring the consecutive preview images and detecting whether a moving object in the scene to be photographed based on analysis of the acquired consecutive preview images, if yes, resetting the counting unit; and
    a storage unit for storing the final image of the scene to be photographed.

8. The image capturing device as claimed in claim 7, wherein the capturing unit comprises a shutter, a lens unit and an image sensor.

9. The image capturing device as claimed in claim 8, wherein the image sensor with the lens unit is configured for forming the three consecutive preview images of the scene to be photographed before the shutter is triggered.

10. The image capturing device as claimed in claim 7, wherein the final image is captured by the capturing unit if no moving object in the scene.

11. An image capturing device for auto-photographing, comprising:
    a capturing unit for capturing a final image and three consecutive preview images of a scene to be photographed;
    a self-timing unit comprising a counting unit and a detecting unit, the counting unit configured for counting a predetermined time to automatically snapshoot, the detecting unit configured for detecting whether a moving object in the scene to be photographed from the acquired consecutive preview images after the three consecutive preview images are acquired, if yes, resetting the counting unit; and
    a storage unit for storing the final image of the scene to be photographed,
    wherein the three consecutive preview images are superposed as two combined images and meantime the two combined images are superposed again to obtain a judging image by filling a white or light color in an overlapped portion of the foregrounds for detecting a moving object.

12. The image capturing device as claimed in claim 11, wherein the capturing unit comprises a shutter, a lens unit and an image sensor.

13. The image capturing device as claimed in claim 12, wherein the image sensor with the lens unit is configured for forming the three consecutive preview images of the scene to be photographed before the shutter is triggered.

14. The image capturing device as claimed in claim 11, wherein the final image is captured by the capturing unit if no moving object in the scene to be photographed.

15. The image capturing device as claimed in claim 12, wherein the image sensor is one selected from the group consisting of a charge-coupled device image sensor and a complementary metal-oxide-semiconductor image sensor.

* * * * *